United States Patent
Bito et al.

(10) Patent No.: US 7,897,282 B2
(45) Date of Patent: Mar. 1, 2011

(54) AA ALKALINE BATTERY

(75) Inventors: Yasuhiko Bito, Osaka (JP); Fumio Kato, Osaka (JP); Harunari Shimamura, Osaka (JP)

(73) Assignee: Panasonic Corporation, Osaka (JP)

( * ) Notice: Subject to any disclaimer, the term of this patent is extended or adjusted under 35 U.S.C. 154(b) by 82 days.

(21) Appl. No.: 12/335,278

(22) Filed: Dec. 15, 2008

(65) Prior Publication Data
US 2009/0181307 A1 Jul. 16, 2009

Related U.S. Application Data

(60) Provisional application No. 61/022,670, filed on Jan. 22, 2008.

(30) Foreign Application Priority Data

Jan. 11, 2008 (JP) .............................. 2008-004674

(51) Int. Cl.
*H01M 4/42* (2006.01)
(52) U.S. Cl. ........................ 429/229; 429/165; 429/166
(58) Field of Classification Search ................ 429/229, 429/165, 166, 167
See application file for complete search history.

(56) References Cited

U.S. PATENT DOCUMENTS

| | | | |
|---|---|---|---|
| 5,080,985 A | | 1/1992 | Wiacek et al. |
| 5,168,018 A | | 12/1992 | Yoshizawa et al. |
| 5,240,793 A | * | 8/1993 | Glaeser ...................... 429/206 |
| 5,312,476 A | * | 5/1994 | Uemura et al. ................ 75/347 |
| 5,445,908 A | * | 8/1995 | Inoue et al. .................. 429/229 |
| 5,656,038 A | * | 8/1997 | Ekern et al. ................ 29/623.1 |
| 5,721,068 A | * | 2/1998 | West et al. ................... 429/300 |
| 2005/0106461 A1 | | 5/2005 | Moore et al. |
| 2006/0003224 A1 | | 1/2006 | Adachi et al. |
| 2006/0246353 A1 | | 11/2006 | Guo et al. |
| 2007/0072077 A1 | * | 3/2007 | Kusumoto et al. ........ 429/218.1 |
| 2007/0224495 A1 | | 9/2007 | Gibbons et al. |
| 2007/0248879 A1 | * | 10/2007 | Durkot et al. ............... 429/130 |
| 2007/0248880 A1 | | 10/2007 | Ndzebet et al. |

(Continued)

FOREIGN PATENT DOCUMENTS

JP 60-180058 9/1985

(Continued)

OTHER PUBLICATIONS

United States Office Action issued in U.S. Appl. No. 12/334,939 dated Jul. 23, 2009.

(Continued)

*Primary Examiner*—Dah-Wei D Yuan
*Assistant Examiner*—Amanda Barrow
(74) *Attorney, Agent, or Firm*—McDermott Will & Emery LLP

(57) ABSTRACT

An AA alkaline battery according to the present invention includes: a positive electrode; a negative electrode; a separator; an alkaline electrolyte; and a negative electrode current collector. The negative electrode contains zinc, indium, and bismuth. The weight of zinc is 4.0 g or more, and the total weight of indium and bismuth is 450 ppm or less with respect to the weight of zinc. The negative electrode current collector contains copper. Tin is provided on at least part of the surface of the negative electrode current collector.

4 Claims, 1 Drawing Sheet

U.S. PATENT DOCUMENTS

2007/0292762 A1 12/2007 Johnson

FOREIGN PATENT DOCUMENTS

| JP | 2-267856 A | 11/1990 |
| --- | --- | --- |
| JP | 05-109411 | 4/1993 |
| JP | 06-163024 | 6/1994 |
| JP | 11-144690 | 5/1999 |
| JP | 2006-032320 | 2/2006 |

OTHER PUBLICATIONS

United States Office Action issued in U.S. Appl. No. 12/334,105 dated Jul. 24, 2009.

United States Office Action issued in U.S. Appl. No. 12/334,105 dated Jan. 28, 2010.

United States Office Action issued in U.S. Appl. No. 12/334,939 dated Mar. 5, 2010.

United States Office Action issued in U.S. Appl. No. 12/334,939, mailed Aug. 4, 2010.

* cited by examiner

AA ALKALINE BATTERY

RELATED APPLICATIONS

This application claims the priority to JP 2008-004674, filed on Jan. 11, 2008 and to U.S. Provisional Application No. 61/022,670, filed on Jan. 22, 2008, both of which are incorporated herein by reference.

BACKGROUND OF THE INVENTION (1) Field of the Invention

The present invention relates to AA alkaline batteries.

(2) Disclosure of Related Art

In alkaline batteries, there is the possibility of generation of hydrogen gas for the structural reasons. The generation of hydrogen gas increases the internal pressure, thus causing a hazard. In view of this, alkaline batteries are designed to prevent generation of hydrogen gas or to ensure the safety of the batteries even with generation of hydrogen gas.

Specifically, an alkaline battery uses zinc as a negative electrode active material and also uses a strong alkaline electrolyte as an electrolyte which is in contact with a negative electrode. Accordingly, the surface of zinc might be corroded by the strong alkaline electrolyte so that hydrogen gas is generated. Since the alkaline battery is hermetically sealed, generation of hydrogen gas in the alkaline battery increases the pressure inside the alkaline battery to cause a hazard to the alkaline battery. To prevent this, bismuth or indium, for example, is added to the negative electrode in the alkaline battery in order to suppress corrosion of zinc by the alkaline electrolyte. In case of an increase in internal pressure of the alkaline battery, a safety valve opens to reduce the pressure inside the alkaline battery.

Such an alkaline battery uses a brass nail-shaped member as a negative electrode current collector in many cases. Brass previously contained iron in a nonnegligible amount, specifically in an amount exceeding 100 ppm with respect to the weight of the negative electrode current collector (i.e., brass). If such a nonnegligible amount of iron is contained in the negative electrode current collector, generation of hydrogen gas might be accelerated. To prevent this, in Japanese Laid-Open Patent Publication No. 05-109411 (hereinafter, referred to as Patent Document 1), tin or indium is provided on the surface of a negative electrode current collector to mask an impurity such as iron. However, brass has high purity in recent years, thus eliminating the necessity of providing tin or indium on the surface of the negative electrode current collector in order to cover iron serving as an impurity.

In recent years, increase in capacity and power and cost reduction have been required of AA alkaline batteries. The increase in capacity of an AA alkaline battery is achieved by increasing the loading weight of an active material in the AA alkaline battery. To increase power, the content of the active material in the negative electrode is increased, i.e., the weight of materials (e.g., bismuth or indium) except for the negative electrode active material (i.e., zinc) is reduced. This is because the reaction efficiency of zinc serving as the negative electrode active material is enhanced. In addition, since indium is relatively expensive, reduction in the amount of indium leads to cost reduction of the AA alkaline battery.

SUMMARY OF THE INVENTION

However, it was found that in an AA alkaline battery exhibiting high capacity and high power and fabricated at low cost, an alkaline electrolyte is more likely to leak under an overdischarge state than in a conventional AA alkaline battery.

It is therefore an object of the present invention to suppress leakage of an alkaline electrolyte through overdischarge in an AA alkaline battery exhibiting high capacity and high power and fabricated at low cost.

An AA alkaline battery according to the present invention includes: a positive electrode; a negative electrode; a separator; an alkaline electrolyte; and a negative electrode current collector. The negative electrode contains zinc, indium, and bismuth. The weight of zinc is 4.0 g or more, and the total weight of indium and bismuth is 450 ppm or less with respect to the weight of zinc. The negative electrode current collector contains copper and iron. The weight of iron is 100 ppm or less with respect to the weight of the negative electrode current collector. Tin is provided on at least part of the surface of the negative electrode current collector.

With the above structure in which the weight of zinc is greater than that in a conventional AA alkaline battery, the capacity of the inventive AA alkaline battery is increased.

In addition, with the above structure in which the content of indium and bismuth in the negative electrode is lower than that in the conventional AA alkaline battery, the reaction efficiency of zinc serving as the negative electrode active material is enhanced. As a result, increase in power and cost reduction for the AA alkaline battery is achieved.

Furthermore, with the above structure, when the AA alkaline battery is overdischarged so that copper is eluted from the negative electrode current collector, not only copper but also tin is eluted. This causes copper and tin to be precipitated, as metals, on the surface of zinc particles near the negative electrode current collector. Since the hydrogen overvoltage of tin is higher than that of copper, generation of hydrogen gas is more effectively suppressed than in the case where only copper is precipitated on zinc. As a result, leakage of the alkaline electrolyte through overdischarge is suppressed.

In a preferred embodiment below, the weight of tin is 50 ppm or more with respect to the weight of zinc contained in the negative electrode.

In the inventive AA alkaline battery, the surface of the negative electrode current collector is preferably plated with tin. With this configuration, tin is uniformly eluted from the negative electrode current collector during overdischarge. Consequently, the surface of zinc particles near the negative electrode current collector is sufficiently protected by tin.

In the inventive AA alkaline battery, the surface of the negative electrode current collector is preferably electroplated with tin. With this configuration, tin is provided on the surface of the negative electrode current collector with no impurity mixed therein, unlike the case where the surface of the negative electrode current collector is plated with tin by electroless plating.

DETAILED DESCRIPTION OF THE INVENTION

Figure 1:
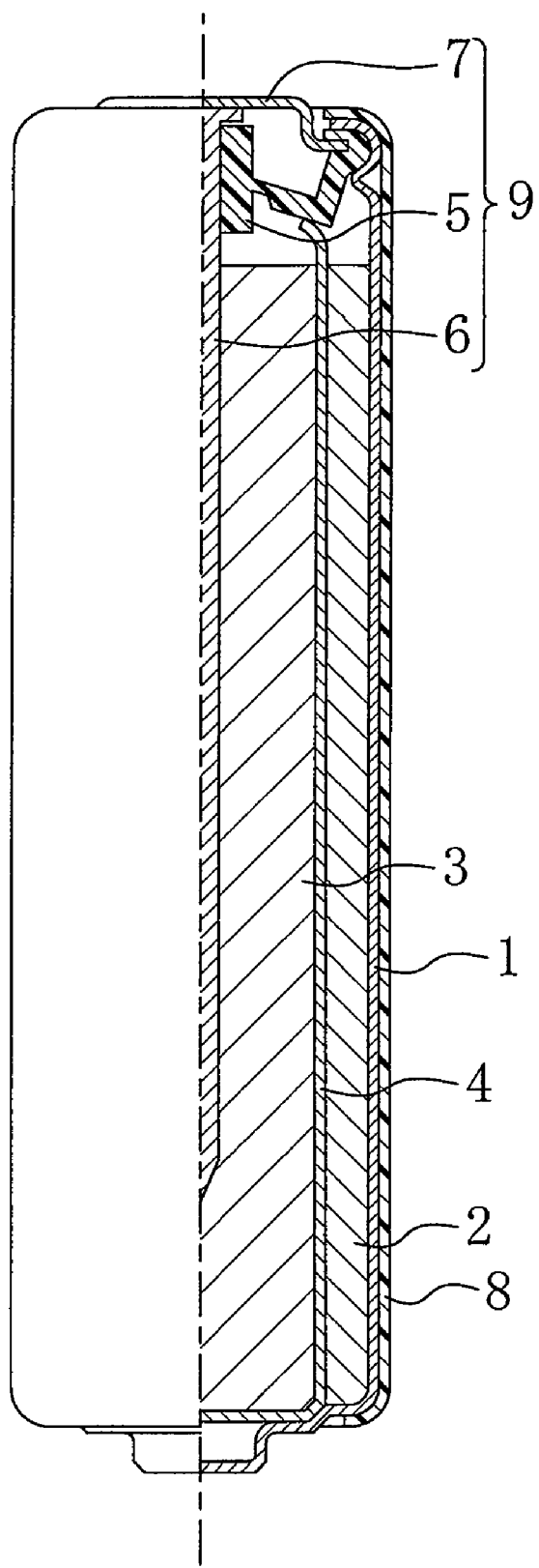
FIG. 1 is a half sectional view illustrating a structure of an AA alkaline battery according to an embodiment of the present invention.

Prior to description of an embodiment of the present invention, circumstances that led to the present invention are explained.

As described above, increase in capacity and power and cost reduction have been recently required of AA alkaline batteries. In view of this, the inventors of the present invention increased the loading weight of a negative electrode active material and reduced the content of indium and bismuth in the negative electrode to produce an AA alkaline battery exhibiting high capacity and high power at low cost. This alkaline battery was overdischarged to check the safety thereof. Then, it was found that when the AA alkaline battery exhibiting high capacity and high power and fabricated at low cost is overdischarged, leakage is more likely to occur than a case where a conventional AA alkaline battery is overdischarged. Before explaining reasons that the inventors believe, causes of leakage of an alkaline electrolyte by overdischarging an AA alkaline battery are now explained.

As an example, consider a case where AA alkaline batteries having different capacities are serially connected to form a circuit. In this case, discharge of an AA alkaline battery having a lower capacity is completed before an AA alkaline battery having a higher capacity. If the lower-capacity AA alkaline battery is still discharged after completion of discharge thereof (i.e., is overdischarged), the voltage of another AA alkaline battery serially connected to this lower-capacity AA alkaline battery is forcedly applied to the lower-capacity AA alkaline battery. Consequently, in the lower-capacity AA alkaline battery, polarity reversal (i.e., switching between the positive electrode and the negative electrode) occurs so that the voltage comes to have a negative value (e.g., −2 V). Thereafter, when the higher-capacity battery is fully discharged, the voltage of the lower-capacity battery subjected to polarity reversal returns to about 0 V.

The negative electrode current collector is made of brass in many cases. In these cases, when polarity reversal causing the voltage to be about −2 V occurs, copper contained in brass is eluted from the negative electrode current collector in the form of ions and is precipitated, as a metal, on the surface of zinc particles near the negative electrode current collector. The hydrogen overvoltage of copper is lower than that of zinc. Accordingly, in an AA alkaline battery in which polarity reversal occurs, when the voltage returns to about 0 V after the polarity reversal, copper precipitated on the surface of zinc accelerates generation of hydrogen gas at the negative electrode. Specifically, when the AA alkaline battery is overdischarged, copper is eluted from the negative electrode current collector and is precipitated on zinc, resulting in generating a larger amount of hydrogen gas. When hydrogen gas is generated in the AA alkaline battery, the internal pressure of the AA alkaline battery increases so that the safety valve opens to release the hydrogen gas to outside the AA alkaline battery. At this time, from the open safety valve, not only hydrogen gas but also the alkaline electrolyte is released.

When the AA alkaline battery is overdischarged in the manner described above, generation of hydrogen gas is accelerated so that leakage of the alkaline electrolyte is more likely to occur. Based on the foregoing mechanism, the inventors of the present invention concluded that increase in capacity and power and cost reduction of AA alkaline batteries lead to generation of a larger amount of hydrogen gas and a higher possibility of leakage.

For example, it is predicted that when the loading weight of the negative electrode active material is increased in order to increase the capacity of an AA alkaline battery, a larger amount of zinc is corroded by the alkaline electrolyte so that a larger amount of hydrogen gas is generated. It is also predicted that the increase in loading weight of the negative electrode active material reduces clearance in the battery case so that the internal pressure of the AA alkaline battery increases at higher speed.

Indium and bismuth are used in order to prevent corrosion of the negative electrode (particularly, zinc) by the alkaline electrolyte. Accordingly, it is predicted that when the amount of indium and bismuth is reduced in order to achieve power increase or cost reduction of the AA alkaline battery, it becomes more difficult to suppress corrosion of the negative electrode by the alkaline electrolyte, i.e., a larger amount of hydrogen gas is generated.

The inventors conducted studies based on the foregoing consideration to find that contrivance in the structure of the negative electrode current collector enables suppression of generation of hydrogen gas through overdischarge. Hereinafter, an embodiment of the present invention will be described with reference to the drawing.

FIG. 1 is a half sectional view illustrating a structure of an AA alkaline battery according to this embodiment.

As illustrated in FIG. 1, the AA alkaline battery includes a cylindrical battery case 1 which is sealed at one end (i.e., at the lower end in FIG. 1). The outer surface of the battery case 1 is covered with an exterior label 8. The battery case 1 serves as a positive electrode terminal and a positive electrode current collector. A hollow cylindrical positive electrode 2 is inscribed in the battery case 1. A separator 4 is provided in the hollow portion of the positive electrode 2 and formed in the shape of a cylinder which is sealed at one end. A negative electrode 3 is placed in the hollow portion of the separator 4. Accordingly, the battery case 1 is configured such that the positive electrode 2, the separator 4, and the negative electrode 3 are arranged in this order in the direction from the periphery to the center thereof.

The opening (i.e., the upper end in FIG. 1) of the battery case 1 is sealed by an assembled sealing unit 9. The assembled sealing unit 9 is configured by integrating a nail-shaped negative electrode current collector 6, a negative electrode terminal plate 7, and a resin gasket 5. The negative electrode terminal plate 7 is electrically connected to the negative electrode current collector 6. The resin gasket 5 is fixed to the negative electrode current collector 6 and the negative electrode terminal plate 7. In fabricating an AA alkaline battery, power generation elements such as the positive electrode 2 and the negative electrode 3 are housed in the battery case 1, and then the opening of the battery case 1 is sealed by the assembled sealing unit 9.

The positive electrode 2, the negative electrode 3, and the separator 4 contain an alkaline electrolyte (not shown). As the alkaline electrolyte, an aqueous solution containing 30 to 40 wt. % of potassium hydroxide and 1 to 3 wt. % of zinc oxide is used.

Components of the AA alkaline battery of this embodiment are now described.

The battery case 1 is obtained by, for example, pressmolding a nickel-coated steel plate into a predetermined shape having predetermined dimensions with a known method disclosed in, for example, Japanese Laid-Open Patent Publications Nos. 60-180058 and 11-144690.

The positive electrode 2 contains a mixture of a positive electrode active material such as electrolytic manganese dioxide powder, a conductive agent such as graphite powder, and an alkaline electrolyte. A binder such as polyethylene powder or a lubricant such as stearate may be added to the positive electrode 2 as necessary.

The negative electrode 3 is obtained by, for example, adding a gelling agent such as polyacrylic acid to an alkaline electrolyte and dispersing zinc (i.e., a negative electrode active material) in the resultant gelled alkaline electrolyte. To suppress zinc dendrite formation, a trace amount of a silicon compound such as silicic acid or silicate may be added to the negative electrode 3 as necessary. The negative electrode 3 is specifically described below.

As the separator 4, nonwoven fabric obtained by mixing mainly polyvinyl alcohol fiber and rayon fiber is used, for example. The separator 4 is obtained with a known method disclosed in, for example, Japanese Laid-Open Patent Publications Nos. 6-163024 and 2006-32320.

A through hole (not shown) into which the negative electrode current collector 6 is press fitted is formed in the center of the resin gasket 5. An annular thinner portion (not shown) functioning as a safety valve is provided around the through hole. An outer circumferential end portion (not shown) is continuously formed along the periphery of the annular thinner portion. The resin gasket 5 is obtained by, for example, injection-molding a material such as nylon or polypropylene into a predetermined shape having predetermined dimensions.

The negative electrode current collector 6 is obtained by press-molding a wire material of, for example, brass into a nail shape having predetermined dimensions. The negative electrode current collector 6 is specifically described below.

The negative electrode terminal plate 7 includes a terminal portion (not shown) for sealing the opening of the battery case 1 and a circumferential flange portion which extends from the terminal portion (not shown) and is in contact with the resin gasket 5. The circumferential flange portion has a plurality of gas holes (not shown) for releasing pressure when the safety valve of the resin gasket 5 is actuated. The negative electrode terminal plate 7 is obtained by, for example, press-molding a nickel-coated or tin-coated steel plate into a predetermined shape having predetermined dimensions.

Now, the negative electrode 3 and the negative electrode current collector 6 of this embodiment are described.

The negative electrode 3 of this embodiment contains zinc as an active material, as in a negative electrode of a conventional AA alkaline battery, but the amount of zinc contained in the negative electrode 3 of this embodiment is larger than that in the conventional AA alkaline battery. Specifically, the AA alkaline battery of this embodiment contains 4.0 g or more of zinc, whereas the conventional AA alkaline battery contains about 3.8 g of zinc. In this manner, the AA alkaline battery of this embodiment contains a larger amount of zinc than the conventional AA alkaline battery. As a result, the capacity is increased.

The negative electrode 3 of this embodiment contains indium and bismuth, as in the negative electrode of the conventional AA alkaline battery, but the amount of indium and bismuth is smaller than that in the conventional AA alkaline battery. Specifically, the ratio of the total weight of indium and bismuth with respect to the weight of zinc is 450 ppm or less in the AA alkaline battery of this embodiment, while being generally 500 ppm or more in the conventional AA alkaline battery. In this manner, the AA alkaline battery of this embodiment contains a smaller amount of indium and bismuth than the conventional AA alkaline battery so that the reaction efficiency of zinc serving as the active material is enhanced. As a result, the power is increased. In addition, in the AA alkaline battery of this embodiment, the weight of expensive indium is reduced as compared to the conventional AA alkaline battery. As a result, the cost is reduced.

To achieve higher power and lower cost of the AA alkaline battery, the ratio of the total weight of indium and bismuth with respect to the weight of zinc is preferably reduced. However, if the ratio is excessively low, generation of hydrogen gas from zinc is hardly suppressed, loosing significance in providing indium and bismuth. Accordingly, the ratio of the total weight of indium and bismuth with respect to the weight of zinc only needs to be 450 ppm or less, and preferably in the range from 100 ppm to 450 ppm, both inclusive.

When an alkaline battery exhibiting high capacity and high power and fabricated at low cost is overdischarged, a larger amount of hydrogen gas is generated through the overdischarge so that leakage of an alkaline electrolyte is likely to occur through the overdischarge. However, in this embodiment, since tin is provided on at least part of the surface of the negative electrode current collector 6, leakage of the alkaline electrolyte through overdischarge is suppressed. Now, the negative electrode current collector 6 is specifically described.

In the AA alkaline battery of this embodiment, tin is provided on at least part of the surface of the negative electrode current collector 6. Accordingly, when polarity reversal occurs, not only copper but also tin is eluted from the negative electrode current collector 6. Consequently, tin as well as copper is precipitated as metals on the surface of zinc particles near the negative electrode current collector 6. Since the hydrogen overvoltage of tin is higher than that of copper, copper and tin precipitated on zinc suppress generation of hydrogen gas when the battery voltage returns to about 0 V, as compared to a case where only copper is precipitated on zinc. In this manner, the use of the negative electrode current collector 6 of this embodiment suppresses generation of hydrogen gas through overdischarge, as compared to the case of using a brass negative electrode current collector whose surface is not provided with tin. Accordingly, it is possible to suppress an increase in internal pressure through overdischarge, resulting in suppressing leakage of an alkaline electrolyte. As a result, the AA alkaline battery of this embodiment exhibits higher capacity and higher power and is fabricated at lower cost than a conventional AA alkaline battery, and is capable of suppressing leakage of an alkaline electrolyte therefrom.

Now, the negative electrode current collector 6 is more specifically described.

As the amount of tin provided on the surface of the negative electrode current collector 6 increases, the amount of tin eluted as ions upon polarity reversal increases. Consequently, generation of hydrogen gas through overdischarge is suppressed. Specifically, it is generally considered that generation of hydrogen gas through overdischarge is suppressed as long as the amount of tin is 50 ppm or more with respect to the weight of zinc contained in the negative electrode 3. However, an excessively large amount of tin is not preferable because the current collection efficiency in the negative electrode current collector 6 might decrease, thus causing performance degradation (e.g., degradation of discharge performance) of the AA alkaline battery. With the foregoing consideration, the amount of tin with respect to the weight of zinc contained in the negative electrode 3 is preferably in the range from 50 ppm to 1000 ppm, both inclusive, because it is possible to suppress generation of hydrogen gas through overdischarge, while ensuring the current collection efficiency of the negative electrode current collector 6. The amount of tin with respect to the weight of zinc contained in the negative electrode 3 is more preferably in the range from 150 ppm to 600 ppm, both inclusive.

Tin only needs to be provided on at least part of the surface of the negative electrode current collector 6, and is preferably provided on the entire surface of the negative electrode current collector 6. For example, the surface of the negative electrode current collector 6 may be plated with tin. When the surface of the negative electrode current collector 6 is plated with tin in this manner, tin is uniformly eluted to the negative electrode 3 and is precipitated on zinc upon polarity reversal so that generation of hydrogen gas through overdischarge is more effectively suppressed than in the case where tin is provided on at least part of the surface of the negative electrode current collector 6. In addition, the surface of zinc particles near the negative electrode current collector 6 is sufficiently protected by tin.

As examples of plating, electroplating and electroless plating are known. The electroless plating is unpreferable for this embodiment because of the following reason: In the electroless plating, a metal is precipitated on the surface of a base material (which is the negative electrode current collector 6 in this embodiment) through reduction-oxidation. Consequently, an impurity such as iron is mixed in tin plating so that the mixed impurity might react with the alkaline electrolyte to accelerate generation of hydrogen gas. On the other hand, in the electroplating, a metal is precipitated on the surface of the base material (which is the negative electrode current collector 6 in this embodiment) through electrochemical reaction. Consequently, an impurity such as iron is less likely to be mixed than in the case of electroless plating, thus suppressing acceleration of generation of hydrogen gas. Therefore, electroplating is preferably employed for tin plating.

Furthermore, in fabrication of the negative electrode current collector 6, for example, iron might be mixed in the negative electrode current collector 6. If iron is mixed in the negative electrode current collector 6, generation of hydrogen gas is accelerated. To prevent this, it is necessary to provide measures such as covering of iron at the surface of the negative electrode current collector as disclosed in, for example, Patent Document 1. In view of this, it is preferable that the negative electrode current collector 6 is free from iron. However, as long as the content of iron is 100 ppm or less with respect to the total weight of the negative electrode current collector 6, acceleration of generation of hydrogen gas is suppressed without measures such as covering of iron.

As described above, the AA alkaline battery of this embodiment exhibits higher capacity and higher power and is fabricated at lower cost than a conventional AA alkaline battery, and is capable of suppressing leakage of an alkaline electrolyte therefrom through overdischarge.

Though not specifically described in this embodiment, since the amount of the negative electrode active material is larger than that in the conventional AA alkaline battery, the amount of the positive electrode active material is preferably increased accordingly.

EXAMPLE

An example of the present invention is now described. In Example below, an AA alkaline battery is fabricated in the following manner, and then the AA alkaline battery is overdischarged to confirm whether leakage occurs or not.

(Method for Fabricating AA Alkaline Battery According to Example)

First, zinc alloy particles containing 0.003 wt. % of Al, 0.015 wt. % of Bi, and 0.020 wt. % of In with respect to the weight of zinc were prepared by a gas atomizing method. Then, these zinc alloy particles were classified with a screen. With this classification, a negative electrode active material which had a grain size of 35 to 300 meshes and in which the ratio of zinc alloy particles having a grain diameter of 200 meshes (i.e., 75 μm) or less was 30% was obtained.

Next, polyacrylic acid and sodium polyacrylate were added to and mixed with 100 weight parts of 34.5 wt. % of a potassium hydroxide aqueous solution (containing 2 wt. % of ZnO) in such a manner that the total weight was 2.2 weight parts, and the resultant mixture was made into gel, thereby obtaining a gelled electrolyte. Thereafter, this gelled electrolyte was left alone for 24 hours to be sufficiently matured.

Then, the zinc alloy particles in an amount 2.00 times as much as a given amount of the gelled electrolyte in weight ratio and 0.05 weight part of a phosphoric acid-based surfactant (e.g., alcohol sodium phosphate ester having an average molecular weight of about 210) with respect to 100 weight parts of those zinc alloy particles were added to and were sufficiently mixed with the gelled electrolyte, thereby obtaining a gelled negative electrode.

Thereafter, electrolytic manganese dioxide (HHTF: a product by TOSOH CORPORATION) and graphite (SP-20: a product by Nippon Graphite Industries, ltd.) were blended at a weight ratio of 94:6, thereby obtaining mixed powder. With 100 weight parts of this mixed powder, 1.5 weight parts of an electrolyte (e.g., 39 wt. % of a potassium hydroxide aqueous solution containing 2 wt. % of ZnO) and 0.2 weight part of a polyethylene binder were mixed. Then, the mixture was uniformly stirred and mixed by a mixer, and was sized to have a given grain size. The obtained grain substance was press formed into a hollowed cylindrical shape. In this manner, a positive electrode mixture in the form of a pellet was obtained.

Subsequently, a sample AA alkaline battery was prepared. Specifically, as illustrated in FIG. 1, two pellets of a positive electrode mixture (weight: 5.15 g per one pellet) were inserted into the battery case 1, and pressure was applied again thereto in the battery case 1, thereby bringing the pellets into close contact with the inner face of the battery case 1. Then, a separator 4 and a bottom insulator for insulating the bottom of the battery case 1 were placed inside the positive electrode mixture pellets. Thereafter, 1.5 g of an electrolyte (e.g., 34.5 wt. % of a potassium hydroxide aqueous solution containing 2 wt. % of ZnO) was injected. After the injection, the inside of the separator 4 was filled with 6.2 g of a gelled negative electrode 3 (containing 4.1 g of zinc alloy particles). Subsequently, the opening of the battery case 1 was sealed by an assembled sealing unit 9 formed by integrating a resin gasket 5, a negative electrode current collector 6, and a negative electrode terminal plate 7. Specifically, the negative electrode current collector 6 was inserted in the negative electrode 3, and the circumferential flange portion of the negative electrode terminal plate 7 was crimped to the rim of the opening of the battery case 1 with the outer circumferential end portion of the resin gasket 5 interposed therebetween, thereby bringing the negative electrode terminal plate 7 into close contact with the opening of the battery case 1. Then, the outer surface of the battery case 1 was covered with an exterior label 8, thus completing an AA alkaline battery according to Example.

As a material of the resin gasket 5, nylon 6,6 was used. The negative electrode current collector 6 was obtained by electroplating, with tin, the surface of a nail-shaped brass wire having a diameter ($\phi$) of 1.425 mm and a length of 33 mm (in which Cu content was 65% and Fe content was 35 ppm with respect to the weight of the negative electrode current collector 6) to a thickness of 1.5 μm. As the separator 4, an alkaline battery separator (i.e., a composite fiber made of vinylon and tencel®) produced by KURARAY CO., LTD. was used.

(Method for Fabricating AA Alkaline Battery According to Comparative Example)

An AA alkaline battery according to Comparative Example was prepared in the same manner as the foregoing fabrication method of an alkaline battery of Example except that the surface of a nail-shaped brass wire having a diameter ($\phi$) of 1.425 mm and a length of 33 mm (in which Cu content was 65% and Fe content was 35 ppm with respect to the weight of the negative electrode current collector 6) and used as a negative electrode current collector was not electroplated with tin.

(Battery Evaluation)

Four batteries (new batteries) according to Example were serially connected and a resistor of 40Ω was further connected thereto. After being left alone for 50 days in an atmosphere of 20° C., these batteries were overdischarged. Then, it was confirmed whether or not leakage occurs in the alkaline batteries after the overdischarge. The same test was performed on batteries of Comparative Example to confirm whether leakage occurs or not. In these tests, four batteries were serially connected with a resistor interposed therebetween. These batteries and resistor were used as one unit. Ten such units (in which the total number of AA alkaline batteries was 40) were tested at a time to obtain the incidence of leakage (%).

As a result, the incidence of leakage was 0% for the batteries of Example, whereas the incidence of leakage was 30% for the batteries of Comparative Example. In most of these cases, leakage occurred in a battery having the lowest capacity among the four serially-connected batteries.

The reason for the difference in leakage incidence between the batteries of Example and the batteries of Comparative Example in the manner described above was estimated to be due to the mechanism described in the embodiment. Specifically, the following phenomenon is predicted: When AA alkaline batteries having different capacities are serially connected and are overdischarged, polarity reversal occurs in the AA alkaline battery having the lowest capacity. In the AA alkaline battery in which polarity reversal occurs, the negative electrode current collector is melt. At this time, since tin is present on the surface of the negative electrode current collector in the AA alkaline battery of Example, tin as well as copper is precipitated, as a metal, on the surface of zinc particles near the negative electrode current collector. On the other hand, for AA alkaline batteries of Comparative Example, the following phenomenon is predicted. Since no tin is present on the surface of the negative electrode current collector, only copper is precipitated as a metal on the surface of zinc particles near the negative electrode current collector. The hydrogen overvoltage of tin is higher than that of copper. Accordingly, when the voltage of the AA alkaline battery in which polarity reversal occurs returns to about 0 V, occurrence of hydrogen gas is more effectively suppressed in the AA alkaline batteries of Example than those of Comparative Example.

An analysis actually carried out by disassembling batteries after overdischarge showed that only copper was precipitated on zinc particles near the negative electrode current collectors in the batteries of Comparative Example whereas tin as well as copper was precipitated on zinc particles near the negative electrode current collectors in the batteries of Example.

What is claimed is:

1. An AA alkaline battery, comprising:
   a positive electrode;
   a negative electrode;
   a separator placed between the positive electrode and the negative electrode;
   an alkaline electrolyte; and
   a negative electrode current collector provided in the negative electrode,
   wherein the negative electrode contains zinc, indium, and bismuth,
   the weight of zinc contained in the negative electrode is 4.0 g or more,
   the total weight of indium and bismuth contained in the negative electrode is 450 ppm or less with respect to the weight of zinc contained in the negative electrode,
   the negative electrode current collector contains copper and iron,
   the weight of iron contained in the negative electrode current collector is 100 ppm or less with respect to the weight of the negative electrode current collector,
   tin is provided on at least part of the surface of the negative electrode current collector, and
   the negative electrode includes a gelled alkaline electrolyte.

2. The AA alkaline battery of claim 1, wherein the weight of tin provided on at least part of the surface of the negative electrode current collector is 50 ppm or more with respect to the weight of zinc contained in the negative electrode.

3. The AA alkaline battery of claim 1, wherein the surface of the negative electrode current collector is plated with tin.

4. The AA alkaline battery of claim 3, wherein the surface of the negative electrode current collector is electroplated with tin.

* * * * *